Nov. 22, 1949  C. H. PABST ET AL  2,489,047
GARDEN RAKE TRASH CLEANER
Filed July 21, 1947

INVENTORS.
Charles H. Pabst
Willard H. Graver
BY
ATTORNEY

Patented Nov. 22, 1949

2,489,047

UNITED STATES PATENT OFFICE 2,489,047

GARDEN RAKE TRASH CLEANER

Charles H. Pabst and Willard H. Graver,
Pittsburg, Kans.

Application July 21, 1947, Serial No. 762,456

1 Claim. (Cl. 56—400.10)

This invention relates to garden tools and particularly to the conventional type of garden rakes, the primary aim being to provide a manually operable trash cleaner for the tines of said rake, capable of effectively removing all trash and foreign articles generally from the said rake tines through the simple expedient of grasping a handle forming a part thereof.

The most important object of this invention is the provision of a garden rake cleaner having a single looped member formed to present a grip at one end thereof and having means for pivotal connection to the rake handle, said looped member including an elongated bar disposed across the tines to remove trash therefrom and the member is moved on its pivot.

Another important object of this invention is the provision of a garden rake trash cleaner of the aforesaid character, having a pair of brackets for limiting the movement of said cross bar to substantially the length of said tines.

Another object of this invention includes the way in which the aforesaid brackets constitute the only part of the device having any contacting or otherwise close proximity whatsoever to the rake teeth; the way in which the entire looped member is made from a single length of material; and the manner in which the looped member is yieldably held at one end of its path of travel.

Figure 1:
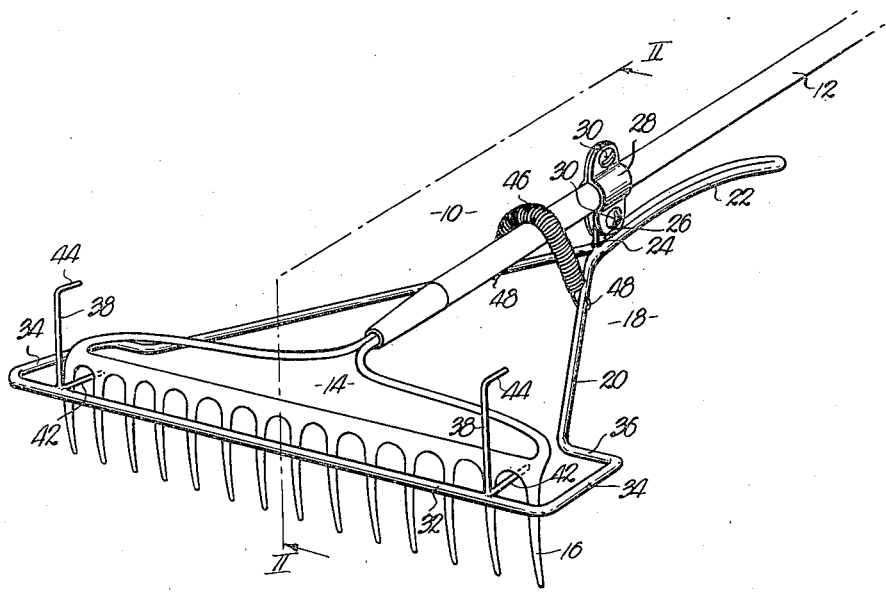
Figure 2:
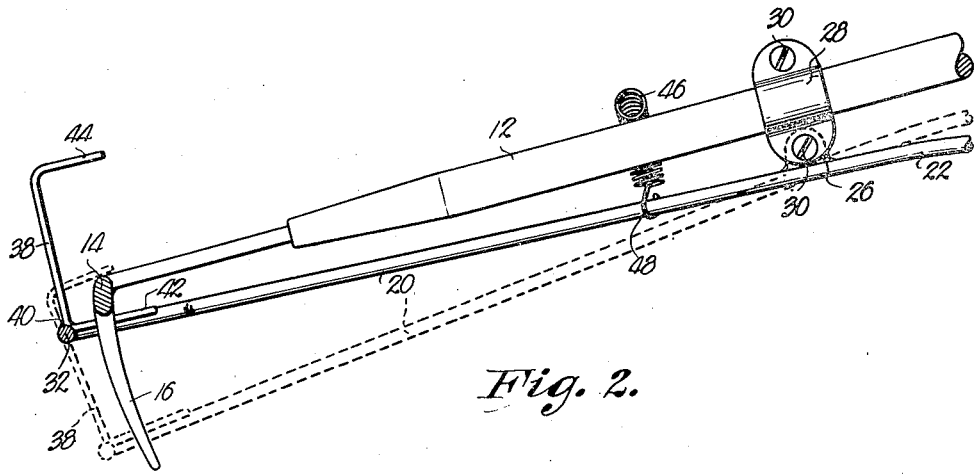

Many minor objects will be made clear or become apparent in the course of the following specification, reference being had to the accompanying drawing wherein Figure 1 is a fragmentary, perspective view of a conventional garden rake showing the trash cleaner made in accordance with the present invention operably attached thereto, and Fig. 2 is a cross-sectional view taken on line II—II of Fig. 1.

The trash cleaner forming the subject matter of the present invention is particularly adapted for use with virtually any of the various types of garden rakes now obtainable upon the open market. The garden rake shown in the drawing and broadly designated by the numeral 10 is therefore for illustrative purposes only. This rake includes a handle 12 and a bar 14 secured to one end of the handle 12. The bar 14 is provided with a plurality of normally downturned teeth or tines 16 in the usual manner.

The trash cleaner per se is broadly designated by the numeral 18 and includes a continuous looped member 20. This looped member 20 is preferably made from a suitable wire-like material and is bent upon itself at one end thereof to present a handle or grip 22.

The two portions of member 20 forming the grip 22 are in close juxtaposition and held together by welding or the like 24. This welding also serves to attach an ear 26 to the member 20 adjacent the innermost end of the grip 22. This ear 26 extends laterally and normally upwardly from the member 20 and receives a clamp 28. This clamp 28 constitutes a pair of opposed members contoured to circumscribe the handle 12 of the rake 10.

A pair of bolts or the like 30 interconnect the two sections of clamp 28 to hold the same in gripped relationship to the handle 12 intermediate the ends of the latter. The lowermost of the bolts 30 passes through an opening in the ear 26 to pivotally mount the member 20 upon the handle 12 of rack 10.

The end of the member 20 opposite to the grip 22 is formed to present an elongated cross bar 32. This cross bar 32 extends the entire length of all the tines 16 of bar 14 and slightly beyond each end thereof. Bar 32 is preferably disposed along the outermost face of the bar 14 and tines 16 and in spaced relationship thereto although it is understood that this cross bar 32 may well be disposed on the innermost face of bar 14 if desired.

The ends of cross bar 32 extend slightly beyond the end teeth 16 and project rearwardly in a pair of arms 34. These arms 34 are then inturned as at 36 whereby the toothed bar 14 is slightly embraced by cross bar 32 and extensions 34 and 36.

A pair of U-shaped brackets 38 are secured to the cross bar 32 by welding or the like as at 40. One leg 42 of each of these brackets 38 extends between a pair of tines 16 of rack 10. The other leg 44 of bracket 38 overlaps bar 14.

A coil spring 46 is disposed in partial circumscribing relationship to the handle 12 and has its ends 48 hooked over the member 20 in the manner illustrated in Figs. 1 and 2.

This spring 46 is loosely disposed about the handle 12 and the end hooks 48 thereof also loosely embrace the two V-shaped legs of member 20. It is clear from the foregoing that spring 46 will yieldably hold a member 20 at the uppermost end of its path of travel where the leg 42 of each of the brackets 38 engage the bar 14 between the respective teeth 16 thereof. It is in this position of the assembly 18 that the rake 10 is placed in use. When trash or other foreign matter collects in the teeth 16 of rake bar 14 and fails to pull itself loose during use of the rake 10, the operator simply grasps handles 12 and 22 and moves the same together. This action swings member 20 on its pivot ear 26 and causes downward movement of cross bar 32 along the length of tines 16. This action will cause cross bar 32 to quickly and effectively remove all trash accumulated in tines 16.

The leg 44 of brackets 38 will strike the uppermost longitudinal edge of bar 14 and limit the extent of downward movement of cross bar 32 along tines 16.

It is appreciated that any number of the brackets 38 may be used and that perhaps only one may be needed secured to cross bar 32 at about its center. It is further understood that the leg 44 of brackets 38 may be omitted and that the downward movement of cross bar 32 may be limited by the grip 22 striking the handle 12 of rake 10.

It is also understood that in lieu of the type of spring 46 illustrated, a coil spring may be interposed between the grip 22 and handle 12 to yieldably maintain cross bar 12 in the normally inoperative position illustrated in the drawing. Another way of simplifying the device is to eliminate the extension 36 and to bend extension 34 at the same angle as the main body portion of member 20. It is contemplated further that cheapness of construction may be enhanced by extending the portions 34 through the tines 16 whereby the brackets 38 are entirely eliminated if downward movement of cross bar 32 is limited by grip 22 striking handle 12.

In any event the entire device as herein disclosed and described is extremely simple to construct and operate and inasmuch as the member 20 is formed from a single length of wire or the like and is continuous throughout its length, the entire cleaner may be made at a very low cost. The disposition of the grip 22 relatively near the toothed bar 14 of rake 10 is designed to eliminate bulkiness and to reduce cost of production. Manifestly member 20 could well be extended to dispose grip 22 near the normally uppermost free end of handle 12 if desired to the end that the operator might manipulate the trash cleaner without stooping or bending. All these possible changes and modifications along with many others may be made without departing from the spirit of this invention or scope of the appended claim.

Having thus described the invention, what is claimed as new and desired to be secured by Letters Patent is:

A trash cleaner for a rake having a handle provided with a toothed bar at one end thereof, said cleaner comprising a closed loop member pivotally secured intermediate the ends thereof to said rake handle, said loop member having a single cross-bar disposed across the teeth of said rake bar and spaced from the outermost face thereof; and at least one U-shaped bracket for limiting the extent of movement of said loop member on its pivot, the bight of said bracket being secured to the cross-bar and having its legs extending toward said rake handle with one leg thereof disposed between one pair of said teeth and the other leg overlying the said bar.

CHARLES H. PABST.
WILLARD H. GRAVER.

REFERENCES CITED

The following references are of record in the file of this patent:

UNITED STATES PATENTS

| Number | Name | Date |
| --- | --- | --- |
| 588,330 | Green | Aug. 17, 1897 |
| 1,136,002 | Gardner | Apr. 20, 1915 |
| 1,195,885 | Welsch | Aug. 22, 1916 |
| 2,179,946 | Miller | Nov. 14, 1939 |